(12) United States Patent
Karlsen et al.

(10) Patent No.: US 9,368,257 B2
(45) Date of Patent: Jun. 14, 2016

(54) INTERNAL COOLING OF POWER CABLES AND POWER UMBILICALS

(71) Applicant: NEXANS, Paris (FR)

(72) Inventors: Jan Erik Karlsen, Kolbotn (NO); Raymond Alexander Badowski, Rade (NO); Jon-Arne Hall, Sarpsborg (NO)

(73) Assignee: Nexans, Paris (FR)

(*) Notice: Subject to any disclaimer, the term of this patent is extended or adjusted under 35 U.S.C. 154(b) by 5 days.

(21) Appl. No.: 14/244,442

(22) Filed: Apr. 3, 2014

(65) Prior Publication Data

US 2014/0332247 A1   Nov. 13, 2014

(30) Foreign Application Priority Data

May 8, 2013  (NO) .................................. 20130655

(51) Int. Cl.
| | | |
|---|---|---|
| *H01B 17/22* | (2006.01) | |
| *H01B 7/42* | (2006.01) | |
| *F16L 11/22* | (2006.01) | |
| *H01B 7/04* | (2006.01) | |

(52) U.S. Cl.
CPC ............... *H01B 7/423* (2013.01); *F16L 11/22* (2013.01); *H01B 7/045* (2013.01)

(58) Field of Classification Search
CPC .......... B05B 5/165; H01B 3/22; H01F 27/18; Y02E 40/647; H02G 15/22
USPC ........................ 174/8, 17, 17.1, 15.1, 15.5, 20
See application file for complete search history.

(56) References Cited

U.S. PATENT DOCUMENTS

| | | | |
|---|---|---|---|
| 2,419,053 A | | 4/1947 | Bennett |
| 3,170,026 A | * | 2/1965 | Woodson .................... 174/15.6 |
| 3,429,979 A | * | 2/1969 | Davey ......................... 174/15.6 |
| 3,924,054 A | * | 12/1975 | Falke .......................... 174/15.6 |
| 5,464,039 A | * | 11/1995 | Bergamini ............. G01F 1/662 |
| | | | 137/551 |
| 6,417,457 B1 | | 7/2002 | Aasbo et al. |
| 2006/0243471 A1 | * | 11/2006 | Karlsen et al. .............. 174/15.1 |
| 2014/0221213 A1 | * | 8/2014 | Fukuda ........................ 505/163 |
| 2014/0378312 A1 | * | 12/2014 | Tamada et al. ............... 505/163 |
| 2015/0041171 A1 | * | 2/2015 | Heggdal ..................... 174/15.6 |

* cited by examiner

*Primary Examiner* — Hoa C Nguyen
*Assistant Examiner* — Stanley Tso
(74) *Attorney, Agent, or Firm* — Sofer & Haroun, LLP

(57) ABSTRACT

A power cable (30, 130, 230, 330, 430, 530) includes an outer sheath (32), at least one conductor element (20, 22, 24, 220, 320, 420, 520) arranged within the outer sheath and one or more filler elements (10, 210, 310, 410, 510) arranged within the outer sheath. At least one of the filler elements is hollow such that a cooling fluid can be passed through the filler element.

6 Claims, 3 Drawing Sheets

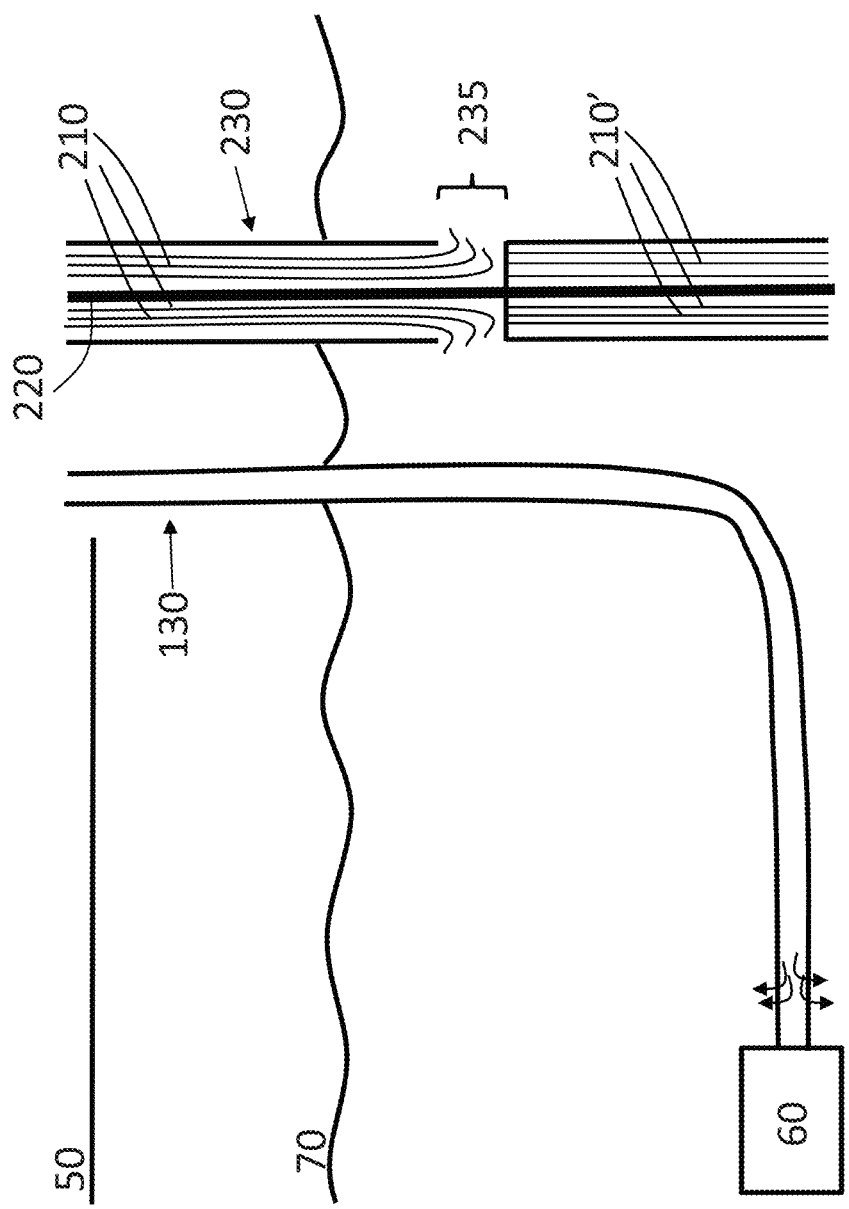

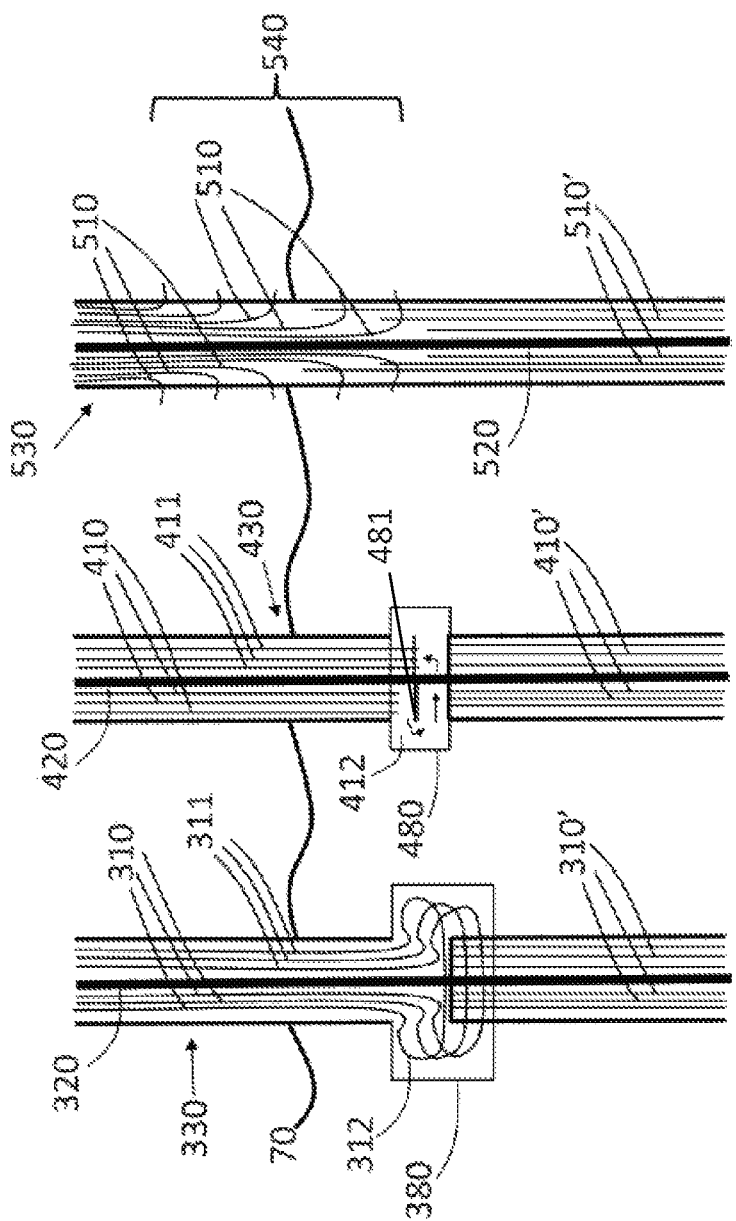

INTERNAL COOLING OF POWER CABLES AND POWER UMBILICALS

RELATED APPLICATION

This application claims the benefit of priority from Norwegian Patent Application No. 2013 0655, filed on May 8, 2013, the entirety of which is incorporated by reference.

BACKGROUND

1. Field of the Invention

The present invention relates to a power cable, especially a power cable or power umbilical cable in need of internal cooling.

2. Description of Related Art

The transfer of electrical power through a power cable results in generation of heat within the cable. The present invention relates to transfer of heat caused by the electrical power away from the insulating-, semi conductive- and protective layers surrounding the power conductor(s) in a cable (power cable or power umbilical). A special problem area is power cables arranged inside guide tubes at platforms or other installations above sea level where the guide tube may be filled with air. This section represents a thermal bottleneck and is often the dimensioning factor for the whole cable length. Bend stiffeners are another known thermal bottleneck independently if arranged above or below the sea surface.

To control the temperature of the power cable or power umbilical external or internal cooling may be employed.

U.S. Pat. No. 6,417,457 discloses a single conductor cable for a subsea pipeline heating system. The cable comprises internal grooves or gaps filled with water. The Water enhances cooling especially if circulated through the cable.

U.S. Pat. No. 3,429,979 discloses forced flow of cooling liquid through a hollow conductor and passages within a high voltage cable. The hollow conductor and the passages are connected such that the cooling medium flows in parallel and periodically changes between flowing through the core and through the outer passages. The outer passages can be cooled by the surroundings or a second cooling fluid such as water or air retained by placing the cable within an outer tube. The water may be discharged after having been passed along the cable or it may be recycled or cooled and reused.

U.S. Pat. No. 2,419,053 discloses a cable with a continuous hollow core through which water can be passed for cooling. The cable is adapted to be floating in the sea.

The prior art solutions provide flow passages for cooling water by increasing the cross-sectional diameter of the cable. Either by employing a hollow core, which increases the diameter of the core and thereby the cable, as the cross sectional area of the core material must be equivalent for allowing the same electrical power supply; or by including a passage for cooling water, where the adding of the passage increases the cross sectional area by the cross sectional area of the passage

OBJECTS AND SUMMARY

One objective of the present invention is to improve the cooling of power cables and power umbilicals, especially when above sea level. A further objective is to provide cooling without increasing the cross sectional area of the cable and or umbilical and where the provided cooling may under certain circumstances even allow for a decrease in the cross sectional size.

Smaller cable conductor size will be warmer for the same power transfer, cooling will enable smaller size of the conductor and be cost effective compared to uncooled.

The present invention provides a power cable comprising an outer sheath, at least one conductor element arranged within the outer sheath and one or more filler elements arranged within the outer sheath, characterised in that the one or more filler elements are hollow such that a cooling fluid can be passed through the filler elements.

Further the present invention provides a power cable, wherein the power cable comprises a perforated section, wherein the perforations provide fluid communication between the internal volume of the hollow filler elements and the exterior of the power cable. The perforated section can be adapted to be at least partly arranged subsea or the perforated section can be adapted to be at least partly arranged above sea level.

In a further aspect the present invention provides a power cable comprising at least two hollow filler elements and a recycling section. In this aspect a cooling fluid can be passed thru a first hollow filler element to the recycling section and passed from the recycling section thru the second hollow filler element.

In another aspect the power cable according to the present invention may further comprise at least one signal transferring element.

The power cable may in a further aspect comprise at least one solid filler element.

In yet another aspect of the power cable according to the present invention the at least one hollow filler element comprises a cross sectional design adapted to support the at least one conductor element and abut at least a part of the inside of the outer sheath.

The power cable is in one aspect hereof adapted to be arranged within an air filled guide tube.

The term "power cable" as used in the present documents refers to an elongated device comprising at least one conductor element for transferring electrical power through the cable. The power cable may comprise 2, 3, 4, 5, 6, 7, 8, 9, 10 or more conductor elements and each conductor element may comprise a solid conductor or a stranded conductor. The "power cable" may optionally further comprise one or more signal transferring wires, and one or more tubes for transferring liquids and accordingly the "power cable" may be a "power umbilical".

The term "filler element" as employed here refers to elements within a power cable or umbilical cable which do not carry electricity or signals in the form of electrical or light impulses. The filler elements do not carry any function other than filling the space inside the circular outer shape and distribute internally the radial installation forces. The filler elements are arranged in the cable with the primary objective to fill the space between the one or more conductor elements and optional signal transferring elements and or one or more fluid transfer lines so as to stabilise the position of these elements within the cable so that the cable can be installed by use of a belt track unit (caterpillar) or over a chute or a wheel. The power conductors, signal transferring elements, and fluid transfer lines often have a circular circumference and it is desirable that the power cable or umbilical also has a circular circumference. When arranging more than one element with a circular cross-section within a circular outer circumference then there will initially be open gaps within the structure and the filler elements have the primary objective of filling these gaps.

The hollow filler elements in the present invention are designed with a structural strength sufficient to provide the function as filler elements both when they are filled with cooling fluid and when they are not filled with cooling fluid. For deep sea applications the hollow structure of the filler elements may additionally provide increased resistance against collapse compared to solid filler elements if perforations are provided allowing the hollow filler to be filled with water form the surroundings during installation.

The terms "diameter", "cross-sectional diameter" and "circumference" as applied here refers to the properties/structure perpendicular to the longitudinal direction of the cable or cable element.

The term "circular" as applied herein includes circles, ellipsoids, egg like shapes, and any other shapes with an at least partly arched shaped.

BRIEF DESCRIPTION OF THE DRAWINGS

The present invention will be described in further details with reference to the enclosed figures:

FIG. 2a is a schematic illustration of a first embodiment of the present invention FIG. 2b illustrates an embodiment of the present invention in further detail.

FIG. 3a illustrates schematically an embodiment with recycling of cooling fluid through the filler elements.

FIG. 3b illustrates an alternative arrangement with recycling of cooling fluid through the filler elements.

FIG. 3c illustrates schematically an embodiment with a perforated section where the hollow inside of the filler elements are brought in contact with the exterior of the power cable.

DETAILED DESCRIPTION

Figure 1:
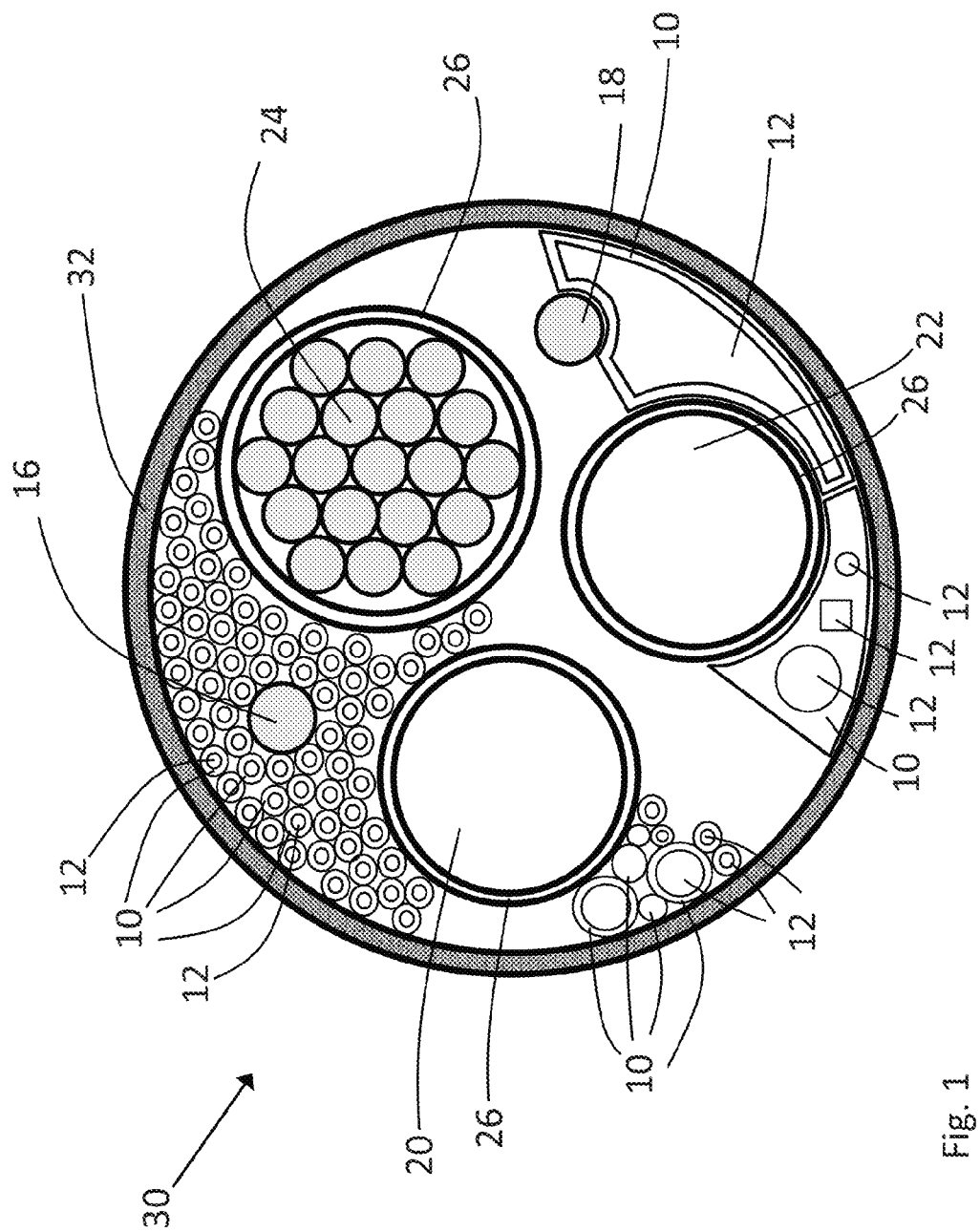
FIG. 1 is a sketch of a cross sectional view of a power cable according to the present invention.

The present invention will be discussed in further detail with reference to the enclosed drawings. It should be noted that the drawings illustrate a number of possible embodiments, but that the present invention may be utilized in a number of power cable designs including power umbilicals and that the drawings are only schematic illustrations showing examples of such cables.

FIG. 1 illustrates schematically a cross sectional view through an power umbilical cable 30 with an outer shell 32, and conductor elements 20, 22 and 24 arranged therein. The purpose of the conductor elements is to transfer electrical power. The conductor elements can be solid conductors or comprise a plurality of conductor elements 24 stranded together and surrounded by a sheet layer 26. The conductor elements 20 and 22 are similarly covered by a sheet layer 26. The number of conductor elements and the design of each of the elements can be freely selected based on the intended use of the power umbilical cable. The arrangement of the conductor elements within the outer shell can also be freely selected and independently of the present invention. The cable illustrated on FIG. 1 further comprises two signal transferring elements 16, 18. These signal transferring elements can be any type of signal transferring element such as electrical or optical signal wires. A power umbilical according to the present invention may also include fluid conduction elements, which could be illustrated similar to the elements 20 and 22, and function as fluid passages for transport of a fluid through the cable. Power umbilicals are well known to include fluid conduction elements for transfer of fluids such as hydrate inhibitor and hydraulic fluid.

In between the conductor elements, signal transferring elements and optional fluid conducting elements filler elements 10 are arranged. On FIG. 1 a number of filler elements 10 are illustrated, some with circular circumference, some with circular circumferences of different diameter and some with a cross sectional shape adapted to abut one or more of the conductor elements or signal transfer elements and form a part of an outer circular circumference of the of the cable to be covered by the outer sheath 32. A cable according to the present invention may comprise one or more filler elements. As illustrated here the different types of filler elements may by used within the same cable but it should be appreciated that the design of the filler elements can be freely selected and combined in any applicable way On FIG. 1 many of filler elements 10 are hollow comprising cross sectional openings 12. The cross sectional openings 12 can have any desired shape, illustrated are circular and rectangular openings as well as openings following the contour of the shape of the filler elements. A cooling fluid can be passed through one or more of the filler elements through the hollow core.

The illustrated cable comprises one outer sheath but additional outer sheaths and layers of different structure may be placed on the outside thereof to adapt the strength and tolerance of the cable to the intended use.

FIG. 2a illustrates a possible arrangement of the cable when in use. The cable 130 is arranged from a platform or floating unit 50 through the sea surface 70 down to a subsea installation 60. A cooling fluid is supplied to one or more of the hollow filler elements (not visible) within 130 at the level of the platform 50. The cooling fluid passes through the cable all the way down to the subsea level. Before the cable is connected to the subsea unit 60 openings through the surface of the cable are provided. These openings are in fluid communication the interior of the hollow filler elements through which cooling fluid is past and accordingly the cooling fluid is released to sea subsea as indicated by the arrows. In the illustrated embodiment the cooling fluid is environmental friendly so that it may be released to sea. The cooling fluid could for instance be water. In this embodiment cooling is provided both in the section of the cable arranged above the sea surface 70 and in the section of the cable arranged below the sea surface.

FIG. 2b illustrates in further details an embodiment of the present invention. Here the cable 230 comprises a number of hollow filler elements 210 and at least on conductor element 220. In this figure and the following figures only one conductor element is illustrated to simplify the drawings; however each cable may comprise additional conductor elements, or signal or fluid transferring elements as well as solid filler elements. Cooling fluid enters the hollow filler elements at the platform level 50 and provides cooling of the cable and the conductor element until a section 235 of the cable arranged below the sea surface 70. In the section 235 the interior of the hollow fillers containing cooling fluid are brought in fluid contact with the surrounding sea thereby releasing the cooling fluid to sea. The cooling fluid is accordingly not directly reused, but the cooling fluid could in one embodiment be seawater, preferably taken from a depth where it naturally has a temperature applicable for cooling the cable, especially in the section exposed to air. In the section of the cable below section 235 the filler elements 210' are not employed for cooling purposes but serve their normal purpose of filler elements FIG. 3a illustrates an embodiment of the present invention comprising recycling of cooling fluid. The section of the cable 330 arranged above sea level 70 comprises at least one conductor element 320 and first and second hollow filler elements 310 and 311. Below sea level a recycling section 380 is arranged comprising recycle loops 312 bringing the interior of a first hollow filler element 310 in fluid communication with the interior of a second hollow filler element 311 thereby allowing for cooling fluid to be passed from the top through a first hollow filler 310 through a recycle loop 312 and back to the top through the second hollow filler element 311. In this embodiment the cooling fluid is recycled back to the platform of floating unit arranged above sea level where the cooling fluid can be cooled for reuse. Any type of cooling fluid as the cooling fluid is kept in a closed loop and not released to the environment. Below the recycling section 380 the filler elements 310' serve their normal purpose as filler elements.

FIG. 3b illustrates another embodiment of the present invention comprising recycling of cooling fluid. The cable 430 comprises a conductor element 420 and first hollow filler elements 410 and second filler elements 411. Further the cable comprises a recycling section 480 with a deflector 481 comprising a fluid passage 412 bringing the interior of the first hollow filler elements 410 in fluid communication with the interior of the second hollow filler elements 411. Below the recycling section 480 the filler elements 410' serve their normal purpose as filler elements.

The recycling section could in one embodiment thereof be arranged inside the outer shell of the cable, so that the outer diameter is kept unchanged. The fluid passage could be provided during production of the cable and could include connecting hollow filler elements arranged side by side within the cable or connecting two passages arranged within the same filler element.

FIG. 3c illustrates a further embodiment of the present invention comprising a cable 530 with a conductor element 520 and hollow filler elements 510. In this embodiment the cable 530 is perforated over a section 540. This section may as illustrated be arranged near the sea level 70, or be arranged partly or fully below sea level or partly or fully above sea level. The perforations are arranged such that fluid communication with the interior of one or more filler elements and the exterior of the cable 530 is established. Cooling fluid entering through the top will exit through the corresponding perforation. Cooling fluid exiting perforations arranged above sea level 70 will travel along the exterior surface of the cable until it reaches sea level and thereby continue to provide cooling to the cable. The cooling fluid is released to the sea and therefore should be an environmental cooling fluid such as water. Below the perforated section the filler elements 510' server the normal purpose of filler elements.

The invention claimed is:

1. A power cable comprising:
   an outer sheath;
   at least one conductor element arranged within the outer sheath;
   and a plurality of filler elements arranged within the outer sheath, said outer sheath forming an outer diameter running the length of said cable,
   wherein said filler elements are hollow such that a cooling fluid can be passed through the filler elements,
   wherein the cable has a common recycling section that includes a common fluid passage that brings an interior of at least two forward hollow filler elements in fluid communication with the interior of at least two return hollow filler elements, said recycling section having a deflector configured to maintain an even fluid passage that prevents fluid vortexes,
   and wherein said recycling section is arranged inside the outer sheath of the cable, so that the outer diameter running the length of said cable remains unchanged at said recycling section.

2. Power cable according to claim 1, wherein the power cable comprises a perforated section, wherein the perforations provide fluid communication between the internal volume of the hollow filler elements and the exterior of the power cable.

3. Power cable according to claim 1, wherein the cable comprises at least one signal transferring element.

4. Power cable according to claim 1, wherein the cable comprises at least one fluid conduction element.

5. Power cable according to claim 1, wherein the cable comprises at least one solid filler element.

6. Power cable according to claim 1, wherein the at least one hollow filler element comprises a cross sectional design adapted to support the at least one conductor element and abut at least a part of the inside of the outer sheath.

* * * * *